March 31, 1964
H. M. HERMANNS
3,126,744
MEASURING APPARATUS
Filed Nov. 28, 1960
2 Sheets-Sheet 1
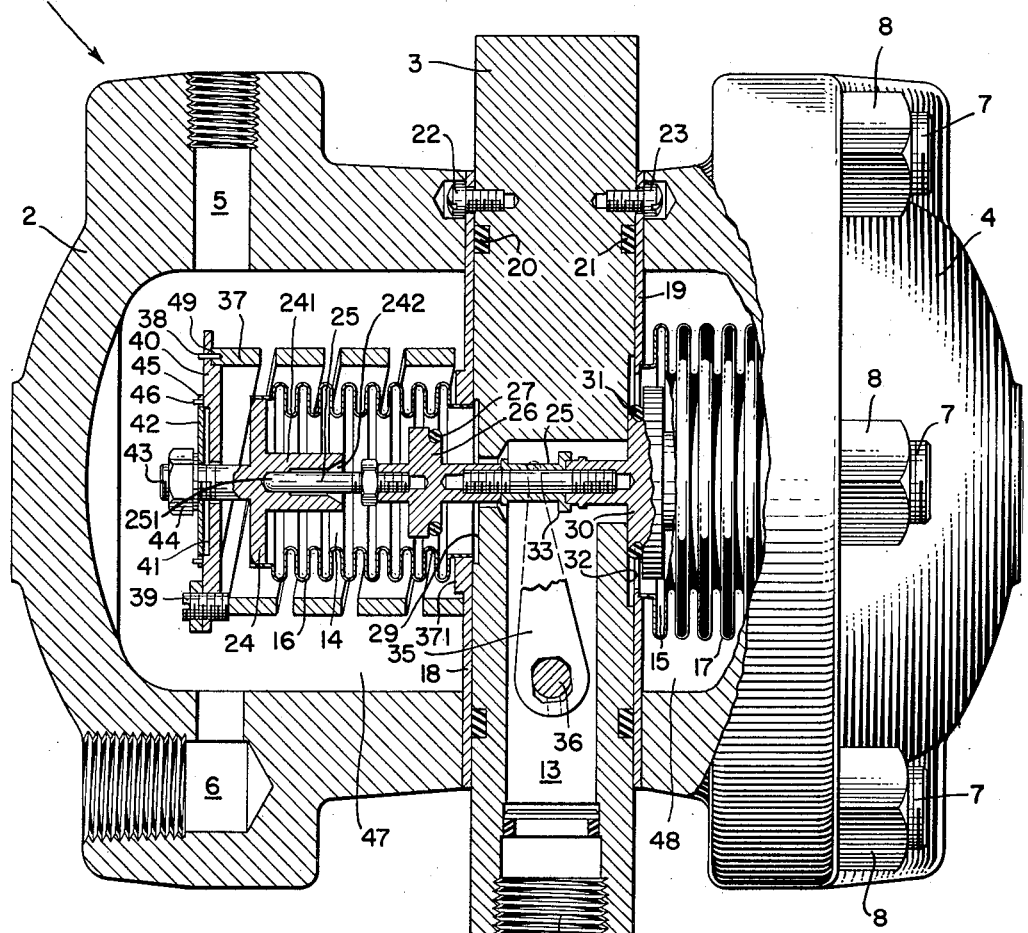
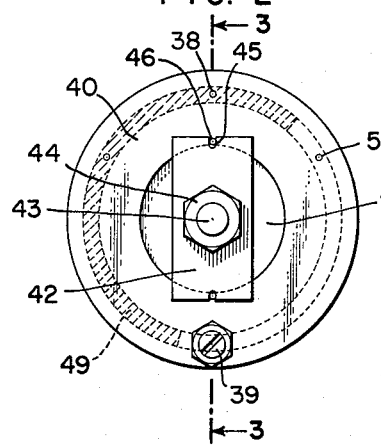
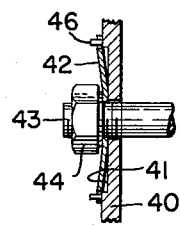
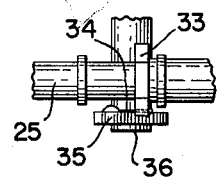
*INVENTOR.*
HENRY M. HERMANNS
BY *Arthur H. Swanson*
ATTORNEY.

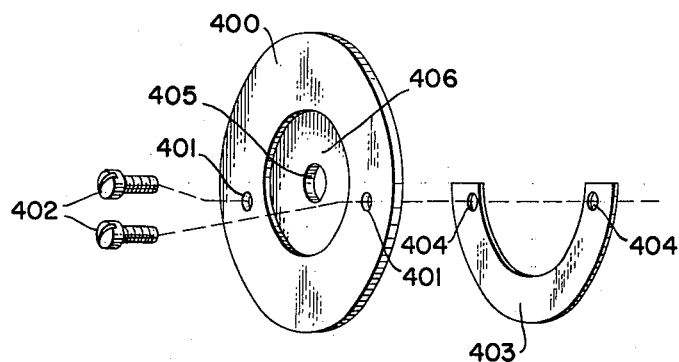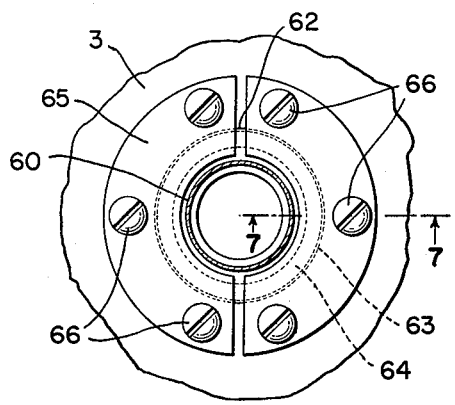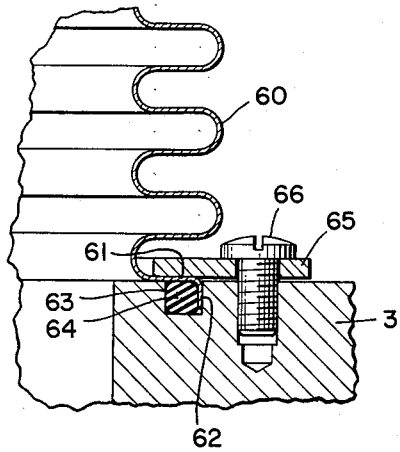

United States Patent Office 3,126,744
Patented Mar. 31, 1964

3,126,744
MEASURING APPARATUS
Henry M. Hermanns, Ardsley, Pa., assignor to Minneapolis-Honeywell Regulator Company, Minneapolis, Minn., a corporation of Delaware
Filed Nov. 28, 1960, Ser. No. 72,147
4 Claims. (Cl. 73—407)

This invention relates to means for applying a force to a movable member. This force varies non-linearly, that is to say, the increments of the change in the force are not equal to the increments of the change in position of the movable member. This force acts on the movable member in opposition to other forces which also vary non-linearly. These two forces can be adjusted so that the resulting movement of the member is linear.

More specifically, this invention comprises two springs whose gradient or stiffness may be adjusted so that the overall stiffness or gradient varies non-linearly.

This spring device of this invention is shown as applied as the range spring of a flow meter but the spring device is capable of many other uses. The spring assembly acts non-linearly to balance out the non-linearity of the meter. This results in a final linear output.

One object of this invention is to provide a spring device whose gradient or stiffness can be adjusted.

A more specific object of this invention is to provide a range spring for a flow meter which range spring can be adjusted so that the output of the flow meter varies linearly.

An additional object of this invention is to provide a meter in which there is a universal joint which permits limited misalignment and lost motion between a valve member, which moves in a straight line, and the active element which actuates the valve member.

A better understanding of the present invention may be had from the following detailed description when read in connection in the accompanying drawings, in which:

FIG. 1 is a longitudinal cross section through a flow meter.

FIG. 2 is an end view of the end of the spring device.

FIG. 3 is a longitudinal, vertical cross-section through one end of the spring device on line 3—3 of FIG. 2 as viewed in the direction of the arrows showing the device in another position.

FIG. 4 is a top or plan view of a detail.

FIG. 5 is an exploded, perspective view of a modification.

FIG. 6 is a transverse, vertical, cross section of a modification.

FIG. 7 is a cross-section line 7—7 of FIG. 6 viewed in the direction of the arrows.

FIG. 1 shows a flow meter adapted to be connected to the opposite sides of an orifice plate in a conduit through which passes the fluid whose flow is to be measured. Such an orifice plate produces a pressure in the fluid on the oncoming or up-stream side of the orifice plate which is higher than the pressure on the off-going or downstream side of the orifice plate. These two pressures, hereinafter referred to as high pressure and low pressure, are conducted to rigid case containing an active or movable member which moves, in response to any difference between these two pressures, in such a way as to measure the flow through the conduit.

The rigid case, generally indicated 1, comprises end discs 2 and 4 and intermediate ring 3. Discs 2 and 4 and ring 3 are rigidly connected together to form a hollow case 1 by means of bolts 7 having nuts 8. Disc 2 has high pressure connections 5 and 6 leading from the outside to the inside thereof. Either connection 5 or 6 may be closed by a plug. A pipe or other conduit is connected to one or both of the high pressure connections. Disc 4, likewise, has low pressure connections leading through it from the outside to the inside. Either low pressure connection may be closed by a plug. One or both of the connections is connected to the low pressure to be measured.

Within rigid case 1 there is an operative connection comprised of a train of mechanism which connects the input element of the meter to the output element thereof. This operative connection is comprised of an active element, means for applying a force to the operative connection of the flow meter to increase the natural spring gradient thereof, and output element which includes a movable valve rod 25, a flexible cable 34, a lever 35, and a torque tube 36.

The active or movable, pressure-responsive element of the device is shown as including thin-walled metallic bellows 16 and 17. The active or movable element may of course be any one of a member of suitable elements such as a piston or a single diaphragm.

The means for applying force to the operative connection of the flow meter include a helically coiled spring 37 and a leaf spring 42. These springs bias the operative connection towards one position along its path of travel.

The movable valve rod 25 has a lost motion connection 251 at its left hand end with the disc 24 which forms part of the active element. Intermediate its ends the movable valve rod 25 has a flange 33 on its outer surface. A flexible cable 34 is connected to flange 33 and to the movable end of a lever 35 which is pivoted on torque tube 36 which is included in the output element of the meter.

As shown, the active element includes a bellows 16 which has a thin, metal wall. Bellows 16 is sealed pressure-tight at its right hand end to case 1 by a sealing ring 18 which is secured to case ring 3 by screws 22. Sealing ring 18 is sealed adjacent to its rim by a sealing ring 20 of smaller diameter. Bellows 17 likewise has a thin wall and is made of metal and is sealed pressure-tight, at its left-hand end, to case 1 by a ring 19 which is secured to ring 3 by screws 23 and which is sealed thereto adjacent to its rim by sealing ring 21 of smaller diameter. Ring 3 contains within it a hollow chamber 13 which communicates with the chamber 14 inside of bellows 16 and with the chamber 15 inside of bellows 17. Chambers 13, 14 and 15 constitute, in effect, a single chamber which is adapted to be filled with an incompressible liquid by removing the plug 49, which is screw threaded into an opening through the ring 3. When the plug 49 is removed from the ring 3, liquid may be poured into this chamber so as to completely fill it. Bellows 16 separates high pressure chamber 47, to which high pressure conduits 5 and 6 connect, from chamber 14. Bellows 17 separates low pressure chamber 48, to which the low pressure conduit connects, from chamber 15. The left hand, free or movable end of bellows 16 is connected to the rim of disc 24. Disc 24 has on its right-hand face an axially extending, cylindrical portion 241 having an axial bore 242 in it. Rod 25 has a hemi-spherical end 251 located in bore 242 and having limited, universal, rocking motion therein. This motion allows slight misalignment between disc 24 and rod 25 but allows rod 25 and the movable valve members mounted on it to move axially of the bellows 16 and 17 in a straight line.

Rod 25 is screw threaded or otherwise connected to a movable valve member comprising disc 26 on which valve sealing ring 27 is mounted. Valve sealing ring 27 may be of O shape or of other shape in cross section. Movable valve disc 26 cooperates with a stationary valve seat formed in ring 3 between chambers 14 and 13. Movable valve rod 25 carries, at its right hand end, a second movable valve element 30 which is sealed by means of sealing ring 31. Ring 31 may have the same cross section as ring 27. Movable valve element 30 operates with a stationary valve seat 32 located in ring 3 between chamber 15 and chamber 13. Movable valve element 30 is connected to the right hand, free or movable end of bellows 17.

FIG. 4 shows that movable valve rod 25 has a flange 33 on its outer surface. Between flange 33 and the movable end of a lever 35, which is pivoted on a torque tube 36, is a flexible cable 34. Torque tube 36 is connected to a torque rod which extends out of case 1. Such torque tubes form the output element of the meter and are well-known and need not be described in detail here. Torque tube 36 biases lever 35 for movement in a counter-clockwise direction. Consequently, the left hand end of rod 25 is held in engagement with the bottom of bore 242.

The operation of the flow meter so far described is as follows:

Assume that the high pressure in chamber 47 is at a selected ratio to the low pressure in chamber 48 and that the flow meter is therefore in stationary or balance condition. Now assume a change in either of these pressures. This change is applied to rod 25, disc 26 and second movable valve element 30 either directly from bellows 17 or from disc 24 or through the incompressible liquid in chambers 14, 13 and 15. This difference in the pressures on the opposite sides of movable valve element causes torque tube 36 to rock by means of a connection between the flange 33 and the lever 35 formed by a flexible cable 34. The torque tube 36 may actuate a pointer, a recording pen, or the actuating element of a controller, either directly or through an amplifying means well-known in the art. These amplifying means may be mechanical, electrical, or pneumatic, all being well-known in the art.

The bellows 16 and 17, shown as examples of movable elements, are thin-walled metallic bellows. Such delicate structures must be protected against overload. In order to provide this protection against overload, the bellows 16 and 17 are mounted in rigid case 1 in such a way as to define the closed chambers 14, 13 and 15 between them. This closed chamber is filled with substantially incompressible liquid. Movable valve elements 26 and 30 are connected to movable portion of one or both of the bellows 16 and 17 and are arranged to seat against the stationary valve seats 29 and 32, respectively. These valves 26 and 29, and 31 and 32 are so arranged that, in the case of an excess pressure applied to either of the bellows 16 or 17, one of the valves closes. This liquid is trapped in the interior of the bellows 16 or 17 exposed to the excessive pressure. Since this liquid is substantially incompressible and since the valve seats against a part of the rigid case 1, the sensitive bellows 16 or 17 is protected against breaking due to overload by the liquid trapped within it.

In the prior art it is known to make the bellows 16 and 17 as nearly alike as possible, i.e. to make the bellows of equal size and like spring characteristics. It is also known in the prior art to make the bellows, as shown herein, of different size and to adjust for the difference in size of the bellows by providing a stabilizing spring between a movable portion of the bellows and the movable valve element.

In order to adapt the flow meter to a wide range of differential pressures, means are provided for applying a force or pressure to the active or movable element of the flow meter to increase the natural spring gradient of the bellows and torque tube which are parts of the meter. These means comprise a helical spring 37 supported at its right hand end on case 1 by a centering ring 371 connected to sealing ring 18. Spring 37 is shown as having a rectangular cross section, but this cross section may be square or round. A portion of the left-hand end of spring 37 contacts a groove in rigid disc 40. That portion of spring 37 which contacts the disc 40, extends for somewhat more than one half of a circle and is indicated 49. The disc 40 has three holes 51 passing through it adjacent its rim. Through a selected one of these holes passes a pin 38 which engages with the end of spring 37. Depending upon which of the holes 51 pin 38 passes through, there is a different distance between the tip of the portion 49 of the end of spring 37, which engages disc 40, and screw 39, which has screw threaded engagement with disc 40 and which can be adjusted manually to project through the disc 40 to a greater or less extent and to engage a portion of the coil spring 37 and thereby render the portion of the coil spring 37 beyond the point of engagement between the screw 39 and the spring 37 inactive. In other words, the entire spring 37 may be active up to the portion 49 which engages with disc 40 or a selected portion of the left-hand end of the spring 37 may be rendered inactive by engaging the screw 39 with a portion of a coil of spring 37.

FIG. 5 shows modified means for attaching the end of spring 37 to the movable or active element. These means comprise a disc 400 having a hole 405 through its center and a counterbore 406 surrounding the hole 405. Disc 400 also has through it a pair of holes 401 adjacent the rim and spaced sufficiently therefrom to allow the end of the spring 37 to be located between the holes 401 and the rim of the disc 400. A clamp 403 of generally U or horse-shoe shape has a pair of holes 404 through it. A pair of mounting screws 402 pass through the holes 401 and engage threads in the holes 404 so that the clamp 403 may be held adjacent one edge of disc 400 so as to hold one end of the spring 37 therebetween. The portion of the spring 37 which is held between the disc 400 and the clamp 403 can be adjusted from practically a semi-circle to a very small arc. The portion of the spring 37 clamped between discs 400 and clamp 403 is inactive. The amount of the spring so clamped varies the gradient and length of travel of the spring 37.

Disc 40 has a perforation through its center through which passes rod 43 bearing on disc 40 by means of a nut 44. Rod 43 is part of disc 24 which carries rod 25 in it.

Surrounding the central opening disc 40 has a counterbore or depression in it. Across the middle part of counterbore 41 extends a flat leaf spring 42 which rests at its ends on the left hand face of disc 40 and is engaged by nut 44. If desired, the spring 42 may be circular in shape and overlie the entire counterbore 41. The width and thickness of the spring 42 and the depth of the counterbore 41 determines the load necessary to cause the inner portion of the spring 42 to engage the bottom of the counterbore 41 and thus render the spring 42 thereafter inoperative. Spring 42 is located in position by notches 45 in its rim which engage with pins 46 on disc 40.

The gradient or stiffness of spring 37 and the length of its path of travel is such that the initial movement of active or movable element 25 causes spring 37 to expand or contract. At a selected point in the path of travel of the entire spring element, the spring 42 starts to bend and can continue this bending movement until the intermediate portion of the spring 42 engages the bottom of counterbore 41. The depth of counterbore 41 parallel to the axis of movable or active elements 25 and the gradient or stiffness of spring 42 determines the amount of travel of spring 42. FIG. 1 shows the spring 42 in the zero or no load position or under a light preload. FIG. 3 shows the intermediate position of movement of the two spring device in which the spring 42 has engaged the bottom of the counterbore 41. After spring 42 has engaged the bottom of counterbore 41, the helical spring 37 alone will deflect for the remainder of the path of travel of the active element.

The holes 51, the pin 38 and the screw 39 permit the gradient or stiffness of the spring 37 to be adjusted. Variation of the width and thickness of spring 42 permits the gradient or stiffness of the spring 42 to be adjusted. The depth of the counterbore 41 limits the distance traveled by the mid-portion of spring 42. These two adjustments affect the overall gradient or stiffness of the spring device. The adjustment of spring 37 and the adjustment of spring 42 apply a force to the movable or active element of the meter. This force varies non-linearly. This force opposes the other spring forces which act on the active or movable element of the meter. These opposing forces also act non-linearly. Therefore, by adjustment of the non-linearity of the force applied by the springs 37 and 42, the active or movable element of the meter can be made to move linearly. Therefore, the output of the meter is likewise linear.

FIGS. 6 and 7 show an alternative means for attaching the active or movable, pressure-responsive element of the device, such as the metallic bellows 16 or 17, to the case 1. These means are shown as comprising a ring 3 which has a groove 63 in it. The end of the bellows 60 has a flat portion 61 adapted to contact with the outer or exposed face of he ring 3 and a projecting ring or flange 62 adapted to enter the groove 63 and to contact with one wall thereof. An O-ring 63 is located in the groove 63 and bears against the flange 62 to form a seal for the bellows 60. A pair of generally C-shaped split rings 65 are secured to ring 3 by screws 66 and overlie the major portion of the flat surface 61 of the bellows 60 and secure the bellows 60 in position against the O-ring 64.

I claim:

1. Means for applying an adjustable force to a movable output element, including, a support, a helical spring engaging at one end with said support, a disc engaging with the free end of said spring, means for varying the amount of the free end of said spring which is active, a leaf spring mounted on and engaging at least a portion of its surface with said disc, an output element operably connected with another portion of said leaf spring, and means causing a third portion of said leaf spring to engage said disc so that said leaf spring is rendered ineffective to vary the force transmitted by said leaf spring to said output element.

2. Means for applying an adjustable force to a movable output element, including, a support, a helical spring engaging at one end with said support, a disc engaging with a portion of the opposite end of spring, said disc having a plurality of holes through it, a pin passing through a selected one of said holes and into said disc so as to secure said disc to a portion of the other end of said spring, said disc having a hole through the center of it and a counterbore surrounding said hole, a movable element having operative connection with said output element and mounted in and passing through the hole in said disc, and a flat leaf spring overlying at least a portion of said counterbore and engaging with a portion of its surface with said disc and engaging with another portion of its surface with said movable element, so that movement of said movable element causes an intermediate portion of said leaf spring to engage the bottom of said counterbore to render said leaf spring ineffective to vary the force which leaf spring transmits to said movable element.

3. A device responsive to the difference between two pressures, including, a rigid case having a pair of inlet connections passing through the wall thereof, an active element secured at its rim to said case and located between said inlet connections so as to move in response to any difference between the pressures applied by said inlet connections, and a range spring device connected at one end to said case and connected at its other end to said active element, said range spring device comprising, a helical spring secured at one end to said case, a disc secured to the free end of said spring, means for rendering a portion of the free end of said helical spring inoperative, a flat leaf spring located between said disc and said active element and adapted to transmit the force from said helical spring to said active element, and means for rendering said leaf spring inoperative to vary the force transmitted from said helical spring to said active element.

4. Means for adapting a device to measure a wide range of differential pressures, including, a rigid case having a hollow interior and a ring projecting in said hollow interior, a sealing ring mounted on one face of said ring of said case, a helical spring mounted at one end on said sealing ring and having a free end, a disc engaging the free end of said helical spring, a screw carried by said disc and projecting therethrough into engagement with a portion of said helical spring so as to render a portion of the free end of said helical spring inoperative to transmit force to said disc, means for rotating said disc relative to the axis of said spring so as to vary the distance between the free end of said spring and the point of engagement of said screw and one of the turns of said spring, an output element passing through the wall of said case and movably mounted and sealed pressure-tight therein, an active element movably mounted and sealed pressure-tight in said case and dividing the interior of said case into a chamber connected to one of said pressures and a second chamber connected to the other of said pressures, a flat leaf spring having a portion engaging a portion of said disc and a portion engaging a portion of said active element and having a third portion movable into and out of engagement with said disc, said leaf spring being inoperative to vary force transmitted from said disc to said active element when said third portion of said leaf spring is in engagement with said disc, and means providing an operative connection between said active element and said output element.

References Cited in the file of this patent

UNITED STATES PATENTS

| | | |
|---|---|---|
| Re. 23,723 | Allwein | Oct. 13, 1953 |
| 1,436,344 | Hickey | Nov. 21, 1922 |
| 1,874,704 | Johnson | Aug. 30, 1932 |
| 2,421,222 | Schaevitz | May 27, 1947 |
| 2,632,474 | Jones | Mar. 24, 1953 |
| 2,664,749 | Jones | Jan. 5, 1954 |
| 2,674,121 | Gorman | Apr. 6, 1954 |

FOREIGN PATENTS

| | | |
|---|---|---|
| 1,120,229 | France | Apr. 16, 1956 |